(12) United States Patent  (10) Patent No.: US 8,518,624 B2
Farrugia et al.  (45) Date of Patent: Aug. 27, 2013

(54) POLYESTER RESIN COMPRISING A BIOPOLYOL

(75) Inventors: Valerie Farrugia, Oakville (CA); Biritawit Asfaw, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/088,324

(22) Filed: Apr. 15, 2011

(65) Prior Publication Data

US 2012/0264047 A1 Oct. 18, 2012

(51) Int. Cl.
*G03G 9/087* (2006.01)

(52) U.S. Cl.
USPC .................... 430/109.4; 430/137.14

(58) Field of Classification Search
USPC .............. 525/34; 430/109.4, 137.14
See application file for complete search history.

(56) References Cited

U.S. PATENT DOCUMENTS

| 2004/0053062 | A1* | 3/2004 | Nava ........................ 428/473.5 |
| 2004/0242756 | A1* | 12/2004 | Komazaki et al. ............. 524/501 |
| 2008/0107989 | A1* | 5/2008 | Sacripante et al. ......... 430/109.4 |
| 2008/0131802 | A1* | 6/2008 | Mizutani et al. ........... 430/109.4 |
| 2008/0145775 | A1 | 6/2008 | Vijayendran et al. |
| 2008/0193869 | A1* | 8/2008 | Vanbesien et al. ......... 430/108.4 |
| 2008/0197283 | A1* | 8/2008 | Veregin et al. ............. 250/315.3 |
| 2009/0297973 | A1 | 12/2009 | Iwamoto et al. |
| 2010/0173239 | A1 | 7/2010 | Iftime et al. |

FOREIGN PATENT DOCUMENTS
JP 11-092553 4/1999

\* cited by examiner

*Primary Examiner* — Hoa V Le
(74) *Attorney, Agent, or Firm* — MDIP LLC (57) ABSTRACT

A polyester resin toner-forming composition containing a biopolyol is described. The biopolyol can enhance branching, crosslinking or both.

19 Claims, 2 Drawing Sheets

POLYESTER RESIN COMPRISING A BIOPOLYOL

FIELD

Polyester resin comprising a biopolyol which can be used to make toner particles; developers comprising said toner particles; devices comprising said toner particles and developers; imaging device components comprising said toner particles and developers; imaging devices comprising said developers; and so on, are described.

BACKGROUND

Emulsion aggregation (EA) toner particles can comprise a polyester resin. The polyester resin can be produced by reacting a polyacid with a polyol to facilitate branching and/or crosslinking to produce polymer particles. Then, the particles are aggregated to form structures of a desired shape and size, followed by the coalescence of the aggregated particles, for example, at elevated temperature. The components incorporated into the toner shape the characteristics of the final toner particles. For example, a colorant may be added, a wax may be added to provide release from a fuser roll, and a binder resin may be added to provide a low minimum fusing temperature (MFT). Another toner property which may be controlled by the components of the EA toner particles is fused image gloss. Examples of teachings of materials and methods for making EA toner include U.S. Pat. Nos. 5,290,654; 5,344,738; 5,346,797; 5,496,676; 5,501,935; 5,747,215; 5,840,462; 5,869,215; 6,828,073; 6,890,696; 6,936,396; 7,037,633; 7,049,042; 7,160,661; 7,179,575; 7,186,494; 7,217,484; 7,767,376; 7,829,253; 7,858,285; and 7,862,971, the disclosures of each of which are hereby incorporated by reference in entirety.

Toner systems generally comprise either a two component system, wherein the developer includes carrier granules, such as, magnetic granules, having toner particles adhering triboelectrically thereto, or a single component system (SDC), which typically uses toner only. Charging the particles enable moving and developing images via electric fields, most often with triboelectricity. Triboelectric charging may occur either by mixing the toner with larger carrier beads in a two component development system or by rubbing the toner between a blade and donor roll in a single component system.

With an increased focus on energy and environmental policies, increasing and volatile oil prices, and public/political awareness of the rapid depletion of global fossil reserves have created an interest and/or need to find sustainable reagents derived from biomaterials. By using renewable feedstock, manufacturers may reduce carbon footprint or achieve a carbon-neutral footprint. Bio-based reagents also are attractive in terms of specific energy and emission savings. Bio-based feedstock may provide new sources of income for domestic agriculture and reduce economic risk and uncertainty associated with reliance on imported petroleum.

Bio-based polyester resins have been developed in an attempt to reduce reliance on petroleum-based reagents. An example is disclosed in U.S. Pub. No. 2009/0155703 which teaches a semi-crystalline biodegradable polyester resin including polyhydroxyalkanoates, wherein the toner is prepared by an emulsion aggregation process. Another example relies on the use of natural triglycerides or vegetable oils, such as rapeseed, soybean and sunflower oils, to provide toner polymer reagents. Other examples of amorphous bio-based polymeric resins include those derived from monomers including a fatty dimer acid, diol of soya oil, D-isosorbide and amino acids, such as, L-tyrosine and glutamic acid, as described in U.S. Pat. Nos. 5,959,066, 6,025,061, 6,063,464, and 6,107,447, and U.S. Pub. Nos. 2008/0145775 and 2007/0015075, the disclosures of each of which are hereby incorporated by reference in entirety.

It is desirable to employ products that have a lower negative impact on the environment, and which are produced using reagents and processes that are more environmentally friendly, such as, those of biological origin.

SUMMARY

The instant disclosure provides a polyester resin comprising a biopolyol which can be used in manufacturing toner for imaging devices. In embodiments, the biopolyol can enhance branching, crosslinking or both of the growing and formed polymers. A biopolyol can be included in the polymerization reaction, added after the polymerization is completed or both.

In embodiments, the biopolyol comprises at least two hydroxyl groups, at least three hydroxyl groups, at least four hydroxyl groups or more. The biopolyol can be obtained from a plant, a microbe or an animal, or can be made based thereon. The biopolyol can be a sugar, an oligosaccharide, a glucose polymer, or a fraction thereof, a sugar alcohol and so on.

In embodiments, the polyester resin is used to make an emulsion-aggregation toner which can be compounded into a developer for use in an imaging device.

DETAILED DESCRIPTION

I. Introduction

The present disclosure provides a polyester resin comprising a biopolyol, which can be used as a crosslinker, that can be used to produce toner particles, toners, developers comprising said toner particles, devices comprising said toner particles or said developers, imaging devices comprising said developers, imaging device components comprising said developers, systems which include such toner particles or developers, and so on.

In embodiments, a toner composition of the instant disclosure can include a colorant, to yield, for example, a cyan, a magenta, a yellow or a black toner; a wax; and so on, as known in the art. A toner can lack a colorant.

As known in the art, branching and crosslinking can occur when reactive pendant groups, reactive sites or side groups are present in a polymer. Generally branching occurs within a polymer and during growth of the polymer. Pendant groups also can serve as a means to crosslink branches within a polymer molecule or plural polymer molecules. Generally, branching results in a polymer that can change reversibly from solid to liquid, while crosslinking generally results in an insoluble polymer. The synthetic conditions to obtain branching and/or crosslinking are known in the art, for example, choice of reactants, reactant concentration, reaction conditions and so on. Various known techniques can be used to determine whether a polymer is branched and/or crosslinked, for example, solubility assays, rheologic assays and so on.

For the purposes of the instant disclosure, the terms, "polyol," and "biopolyol," refer to a compound comprising at least two hydroxyl groups, at least three hydroxyl groups, at least four hydroxyl groups, or more. A biopolyol can be obtained from a plant cell, a microbe or an animal cell, or can be made synthetically based thereon. A biopolyol is one which is biodegradable and generally, readily metabolizable or degraded, for example, by microbial action or digestive processes. A biopolyol is one which normally is not overtly toxic and does not carry an overt negative environmental impact, except, perhaps when present in high or supraphysiological concentrations.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating" and "matching," or grammatic variations thereof, have generally acceptable definitions or at the least, are understood to have the same meaning as, "about."

In the application, use of the singular includes the plural unless specifically stated otherwise. In the application, use of, "or," means, "and/or," unless stated otherwise. Furthermore, use of the term, "including," as well as other forms, such as, "includes," and, "included," is not limiting.

For the purposes of the instant disclosure, "toner," "developer," "toner composition," and "toner particles," can be used interchangeably, and any particular or specific use and meaning will be evident from the context of the sentence, paragraph and the like in which the word or phrase appears.

II. Toner Particles

Toner particles of interest comprise a polyester resin that was made using a biopolyol. Thus, a resin-forming monomer and a biopolyol are reacted with suitable other reactants to form a polymer and in embodiments, a crosslinked structure.

The resin comprises a polyester polymer, and in the context of a toner for use with certain imaging devices, comprises a polyester polymer that solidifies to form a particle. A composition can comprise more than one form or sort of polymer, such as, two or more different polymers, such as, two or more different polyester polymers composed of different monomers. The polymer can be an alternating copolymer, a block copolymer, a graft copolymer, a branched copolymer, a crosslinked copolymer and so on.

The toner particle can include other optional reagents, such as, a surfactant, a wax, a shell and so on. The toner composition optionally can comprise inert particles, which can serve as toner particle carriers, which can comprise the resin taught herein. The inert particles can be modified, for example, to serve a particular function. Hence, the surface thereof can be derivatized or the particles can be manufactured for a desired purpose, for example, to carry a charge or to possess a magnetic field.

A. Components
1. Resin

Toner particles of the instant disclosure include a resin-forming monomer suitable for use in forming a particulate containing or carrying a colorant of a toner for use in certain imaging devices. The polyester-forming monomer is one that is inducible to form a resin, that is, which reacts, sets or solidifies to form a solid. Such a resin, a plastic, an elastomer and so on, whether naturally occurring or synthetic, is one that can be used in an imaging device. Generally, any suitable monomer or monomers are induced to polymerize to form a polyester resin or a copolymer. Any polyfunctional monomer may be used depending on the particular polyester polymer desired in a toner particle. Hence, bifunctional reagents, trifunctional reagents and so on can be used. One or more reagents that comprise at least three functional groups are incorporated into a polymer or into a branch to enable branching, further branching and/or crosslinking. Examples of such polyfunctional monomers include 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane and 1,2,7,8-octanetetracarboxylic acid. Polyester resins, for example, can be used for applications requiring low melting temperature. Formed particles can be mixed with other reagents, such as, a colorant, to form a developer.

One, two or more polymers may be used in forming a toner or toner particle. In embodiments where two or more polymers are used, the polymers may be in any suitable ratio (e.g., weight ratio) such as, for instance, with two different polymers, from about 1% (first polymer)/99% (second polymer) to about 99% (first polymer)/1% (second polymer), in embodiments from about 10% (first polymer)/90% (second polymer) to about 90% (first polymer)/10% (second polymer) and so on, as a design choice.

The polymer may be present in an amount of from about 65 to about 95% by weight, from about 75 to about 85% by weight of toner particles on a solids basis.

a. Polyester Resins

Suitable polyester resins include, for example, those which are sulfonated, non-sulfonated, crystalline, amorphous, combinations thereof and the like. The polyester resins may be linear, branched, crosslinked, combinations thereof and the like. Polyester resins may include those described, for example, in U.S. Pat. Nos. 6,593,049; 6,830,860; 7,754,406; 7,781,138; 7,749,672; and 6,756,176, the disclosures of each of which hereby are incorporated by reference in entirety.

When a mixture is used, such as, amorphous and crystalline polyester resins, the ratio of crystalline polyester resin to amorphous polyester resin can be in the range from about 1:99 to about 30:70; from about 5:95 to about 25:75; in embodiments, from about 5:95 to about 15:95.

A polyester resin may be obtained synthetically, for example, in an esterification reaction involving a reagent comprising a carboxylic acid group and another reagent comprising an alcohol. In embodiments, the alcohol reagent comprises two or more hydroxyl groups, in embodiments, three or more hydroxyl groups. In embodiments, the acid comprises two or more carboxylic acid groups, in embodiments, three or more carboxylic acid groups. Reagents comprising three or more functional groups enable, promote or enable and promote polymer branching and crosslinking. In embodiments, a polymer backbone or a polymer branch comprises at least one monomer unit comprising at least one pendant group or side group, that is, the monomer reactant from which the unit was obtained comprises at least three functional groups.

Examples of polyacids or polyesters that can be used for preparing an amorphous polyester resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The organic polyacid or polyester reagent may be present, for example, in an amount from about 40 to about 60 mole % of the resin, in embodiments from about 42 to about 52 mole % of the resin, in embodiments from about 45 to about 50 mole % of the resin, and optionally a second polyacid can be used in an amount from about 0.1 to about 10 mole % of the resin.

Examples of polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene glycol, and combinations thereof. The amount of organic polyol can vary, and may be present, for example, in an amount from about 40 to about 60 mole % of the resin, in embodiments from about 42 to about 55 mole % of the resin, in embodiments from about 45 to about 53 mole % of the resin, and a second polyol, which can be a biopolyol, can be used in an amount from about 0.1 to about 10 mole %, in embodiments, from about 1 to about 4 mole % of the resin.

Polycondensation catalysts may be used in forming the amorphous (or crystalline) polyester resin, and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be used in amounts of, for example, from about 0.01 mole % to about 5 mole % based on the starting polyacid or polyester reagent(s) used to generate the polyester resin.

In embodiments, the resin may be a crosslinkable resin. A crosslinkable resin is a resin including a crosslinkable group or groups such as a C=C bond or a pendant group or side group, such as, a carboxylic acid group. The resin can be crosslinked, for example, through a free radical polymerization with an initiator. In embodiments, a resin can be crosslinked with a biopolyol of interest.

Examples of amorphous resins which may be used include alkali sulfonated-polyester resins, branched alkali sulfonated-polyester resins, alkali sulfonated-polyimide resins and branched alkali sulfonated-polyimide resins. Alkali sulfonated polyester resins may be useful in embodiments, such as, the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly (ethoxylated bisphenol-A-5-sulfo-isophthalate), wherein the alkali metal is, for example, a sodium, a lithium or a potassium ion.

In embodiments, an unsaturated amorphous polyester resin may be used as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly (ethoxylated bisphenol co-itaconate), poly(butyloxylated bisphenol co-itaconate), poly(co-propoxylated bisphenol co-ethoxylated bisphenol co-itaconate), poly(1,2-propylene itaconate) and combinations thereof.

In embodiments, a suitable amorphous resin may include alkoxylated bisphenol A fumarate/terephthalate-based polyester and copolyester resins. In embodiments, a suitable polyester resin may be an amorphous polyester resin, such as, a poly(propoxylated bisphenol A co-fumarate) resin. Examples of such resins and processes for production thereof include those disclosed in U.S. Pat. No. 6,063,827, the disclosure of which is hereby incorporated by reference in entirety.

An example of a linear propoxylated bisphenol A fumarate resin is available under the trade name SPARII from Resana S/A Industrias Quimicas, Sao Paulo Brazil. Other propoxylated bisphenol A fumarate resins that are commercially available include GTUF and FPESL-2 from Kao Corporation, Japan, and EM181635 from Reichhold, Research Triangle Park, N.C., and the like.

For forming a crystalline polyester resin, suitable organic polyols include aliphatic polyols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like, including their structural isomers. The aliphatic polyol may be, for example, selected in an amount from about 40 to about 60 mole %, in embodiments from about 42 to about 55 mole %, in embodiments from about 45 to about 53 mole %, and a second polyol, which can be a biopolyol, can be used in an amount from about 0.1 to about 10 mole %, in embodiments from about 1 to about 4 mole % of the resin.

Examples of organic polyacid or polyester reagents for preparing a crystalline resin include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, a polyester or anhydride thereof; and an alkali sulfo-organic polyacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfoterephthalate, 5-sulfo-isophthalic acid, dialkyl-sulfoterephthalate, sulfo-p-hydroxybenzoic acid, N,N-bis(2-hydroxyethyl)-2-amino ethane sulfonate, or mixtures thereof. The organic polyacid may be selected in an amount of, for example, in embodiments from about 40 to about 60 mole %, in embodiments from about 42 to about 52 mole %, in embodiments from about 45 to about 50 mole %, and optionally, a second polyacid can be selected in an amount from about 0.1 to about 10 mole % of the resin.

Specific crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipatenonylene-decanoate), poly(octylene-adipate), and so on, wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

Suitable crystalline resins which may be utilized, optionally in combination with an amorphous resin as described above, include those disclosed in U.S. Pub. No. 2006/0222991, the disclosure of which is hereby incorporated by reference in entirety.

In embodiments, a suitable crystalline resin may include a resin formed of ethylene glycol and a mixture of dodecanedioic acid and fumaric acid co-monomers with the following formula:

wherein b is from about 5 to about 2000 and d is from about 5 to about 2000.

Examples of other suitable resins or polymers which may be utilized in forming a toner include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and combinations thereof. The polymer may be, for example, block, random, or alternating copolymers.

The crystalline resin may be present, for example, in an amount from about 1 to about 85% by weight of the toner components, in embodiments from about 2 to about 50% by weight of the toner components, in embodiments from about 5 to about 15% by weight of the toner components. The crystalline resin can possess various melting points of, for example, from about 30° C. to about 120° C., in embodiments from about 50° C. to about 90° C., in embodiments from about 60° C. to about 80° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by GPC using polystyrene standards. The molecular weight distribution ($M_w/M_n$) of the crystalline resin may be, for example, from about 2 to about 6, in embodiments from about 3 to about 4.

b. Biopolyol

A biopolyol can substitute for a portion of the polyol used in a synthesis reaction, with a commensurate reduction in the amount of polyol that would have been used. In embodiments, a biopolyol can be added toward or at the end of a polymerization reaction to obtain crosslinking or branches and chains.

Figure 1:
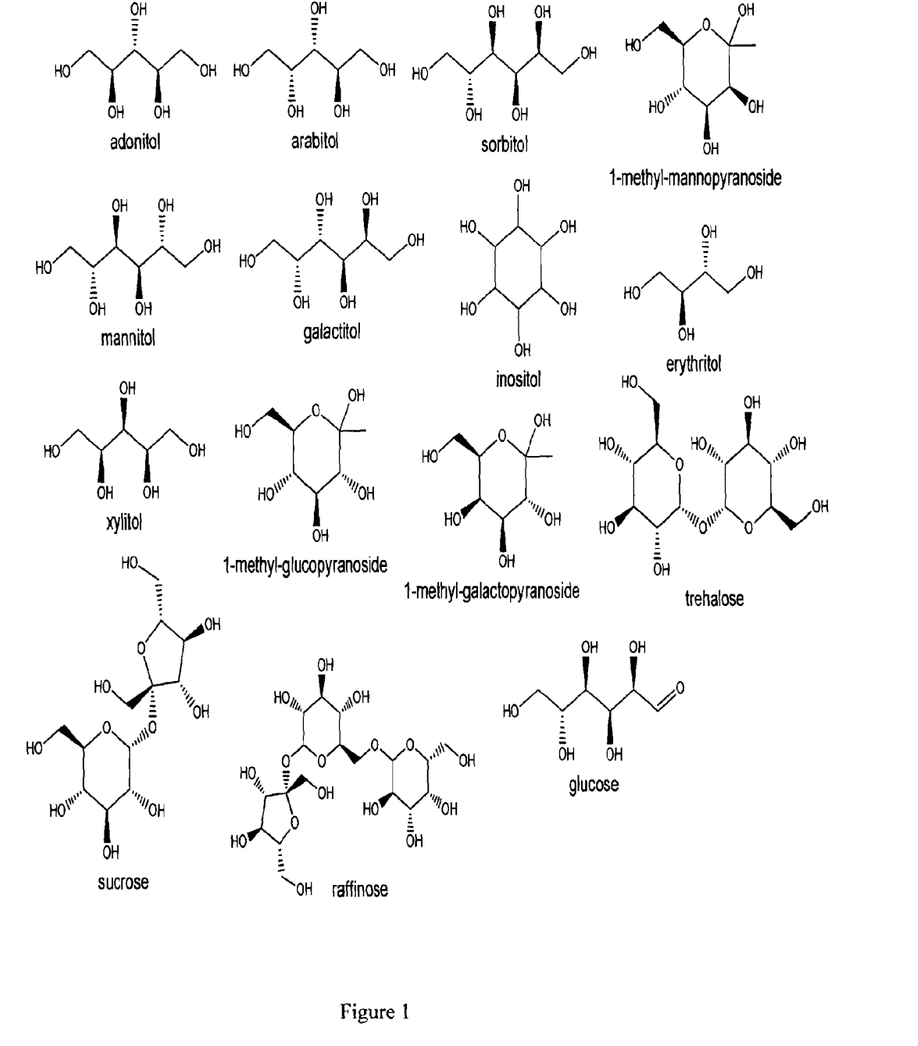
FIG. 1 depicts certain biopolyols, which include sugars and sugar alcohols.

Suitable biopolyols are those that can react with a suitable functional group to form ester bonds and may be selected from, for example, sugars, saccharides, oligosaccharides, glucose polymers, polyhydroxyacids and sugar alcohols, and portions of such polymers. Examples include, adonitol, arabitol, sorbitol, mannitol, galactose, galactitol, lactose, fructose, gluconic acid, lactobionic acid, isomaltose, inositol, lactitol, xylitol, maltitol, 1-methyl-glucopyranoside, 1-methyl-galactopyranoside, 1-methyl-mannopyranoside, erythritol, diglycerol, polyglycerol, sucrose, glucose, amylose, nystose, kestose, trehalose, raffinose, gentianose, combinations thereof and the like, the structures of some of which are presented in FIG. 1. Also, glycogen, a starch, a cellulose, a demineralized or unmodified chitin, a dextrin, a gelatin, a dextrose or other such polysaccharides, or fractions thereof can be used. Those compounds generally are commercially available or can be obtained from natural sources, such as, crustacean shells, practicing known methods.

The biopolyol may be used in an amount of from about 0.01 to about 30 wt %, in embodiments, from about 5 to about 20 wt %, in embodiments, from about 8 to about 15 wt % of a polyester-forming reaction mixture in known reaction schemes with a commensurate reduction in the amount of other polyols used in the reaction.

c. Catalyst

Condensation catalysts which may be used in the polyester reaction include tetraalkyl titanates; dialkyltin oxides, such as, dibutyltin oxide; tetraalkyltins, such as, dibutyltin dilaurate; dibutyltin diacetate; dibutyltin oxide; dialkyltin oxide hydroxides, such as, butyltin oxide hydroxide; aluminum alkoxides, alkyl zinc, dialkyl zinc, zinc oxide, stannous oxide, stannous chloride, butylstannoic acid, or combinations thereof.

Such catalysts may be used in amounts of, for example, from about 0.01 mole % to about 5 mole % based on the amount of starting polyacid, polyol or polyester reagent in the reaction mixture.

Generally, as known in the art, the polyacid/polyester and polyols reagents, including a biopolyol of interest, are mixed together, optionally with a catalyst, and incubated at an elevated temperature, such as, from about 180° C. or more, from about 190° C. or more, from about 200° C. or more, and so on, which can be conducted anaerobically, to enable esterification to occur until equilibrium, which generally yields water or an alcohol, such as, methanol, arising from forming the ester bonds in esterification reactions. The reaction can be conducted under vacuum to promote polymerization. The product is collected by practicing known methods, and can be dried, again, by practicing known methods to yield particulates.

Branching agents can be used, and include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, 1,2,7,8-octanetetracarboxylic acid, acid anhydrides thereof, lower alkyl esters thereof and so on. The branching agent can be used in an amount from about 0.01 to about 10 mole % of the resin, from about 0.05 to about 8 mole % or from about 0.1 to about 5 mole % of the resin.

It may be desirable to crosslink the polymer. A suitable resin conducive to crosslinking is one with a reactive group, such as, a C=C bond or with pendant or side groups, such as, a carboxylic acid group. The resin can be crosslinked, for example, through free radical polymerization with an initiator. Suitable initiators include peroxides such as, organic peroxides or azo compounds, for example diacyl peroxides, such as, decanoyl peroxide, lauroyl peroxide and benzoyl peroxide, ketone peroxides, such as, cyclohexanone peroxide and methyl ethyl ketone, alkyl peroxy esters, such as, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, alkyl peroxides, such as, dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy)hexyne-3, alkyl hydroperoxides, such as, 2,5-dihydro peroxy 2,5-dimethyl hexane, cumene hydroperoxide, t-butyl hydroperoxide and t-amyl hydroperoxide, and alkyl peroxyketals, such as, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate, azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus, the gel content of the polyester material. The amount of initiator used may range from, for example, about 0.01 to about 10 weight %, or from about 0.1 to about 5 weight % of the polyester resin. In the crosslinking, it is desirable that substantially all of the initiator be consumed. The crosslinking may be carried out at high temperature, and thus the reaction may be very fast, for example, less than 10 minutes, such as from about 20 seconds to about 2 minutes residence time.

Crosslinking can be obtained by using a biopolyol of interest when the polymer comprises pendant groups comprising a carboxylic acid group. Hence, a biopolyol can be added to a formed polymer or can be added at the beginning or during the esterification or polymerization reaction. In embodiments, a crosslinking biopolyol comprises at least three functional groups. When added in a latter part of a synthesis reaction or after polymerization is complete, a biopolyol is introduced in an amount of from about 0.01 wt % to about 10 wt %, from about 0.1 wt % to about 5 wt %.

Hence, disclosed herein is a polyester resin suitable for use in imaging comprising a biopolyol, as well as the reagents thereof, which can comprise a mixture of the relevant reagents prior to polymerization, such as, a polyacid/polyester reagent, a polyol reagent and a biopolyol reagent, whether polymerized or not. In embodiments, a polyester resin comprising a biopolyol is produced and processed to form a polymer reagent, which can be dried and formed into flowable particles, such as, a pellet, a powder and the like. The polymer reagent then can be incorporated with, for example, other reagents suitable for making a toner particle, such as, a colorant and/or a wax, and processed in a known manner to produce toner particles.

Polyester resins comprising a biopolyol suitable for use in an imaging device are those which carry one or more properties, such as, a $T_g$(onset) of at least about 40° C., at least about 45° C., at least about 50° C., at least about 55° C.; a $T_s$ of at least about 110° C., at least about 115° C., at least about 120° C., at least about 125° C.; an acid value (AV) of at least about 10, at least about 12.5, at least about 15, at least about 17.5; and an $M_W$ of at least about 5000, at least about 15,000, at least about 20,000, at least about 150,000, at least about 175,000.

2. Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP-604™ and NP-608™; Magnox magnetites, TMB-100™ or TMB-104™; and the like.

Colored pigments, such as, cyan, magenta, yellow, red, orange, green, brown, blue or mixtures thereof can be used. The additional pigment or pigments can be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE I™ available from Paul Uhlich & Company, Inc.; PIGMENT VIOLET I™, PIGMENT RED 48™, LEMON CHROME YELLOW DCC 1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like.

Examples of magenta pigments include 2,9-dimethyl-substituted quinacridone, an anthraquinone dye identified in the Color Index as CI-60710, CI Dispersed Red 15, a diazo dye identified in the Color Index as CI-26050, CI Solvent Red 19 and the like.

Illustrative examples of cyan pigments include copper tetra (octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI-69810, Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3, 2,5-dimethoxy-4-sulfonanilide phenylazo-4'-chloro-2,5-dimethoxy acetoacetanilide and Permanent Yellow FGL.

Other known colorants can be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that can be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example carbon black, cyan, magenta and/or yellow colorant, may be incorporated in an amount sufficient to impart the desired color to the toner. In general, pigment or dye, may be employed in an amount ranging from about 2% to about 35% by weight of the toner particles on a solids basis, from about 5% to about 25% by weight or from about 5% to about 15% by weight.

In embodiments, more than one colorant may be present in a toner particle. For example, two colorants may be present in a toner particle, such as, a first colorant of pigment blue, may be present in an amount ranging from about 2% to about 10% by weight of the toner particle on a solids basis, from about 3% to about 8% by weight or from about 5% to about 10% by weight; with a second colorant of pigment yellow that may be present in an amount ranging from about 5% to about 20% by weight of the toner particle on a solids basis, from about 6% to about 15% by weight or from about 10% to about 20% by weight and so on.

3. Optional Components a. Surfactants

In embodiments, toner compositions may be in dispersions including surfactants. Emulsion aggregation methods where the polymer and other components of the toner are in combination can employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

In embodiments, the surfactant or the total amount of surfactants may be used in an amount of from about 0.01% to about 5% by weight of the toner-forming composition, for example, from about 0.75% to about 4% by weight of the toner-forming composition, in embodiments, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quarternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

b. Waxes

The toners of the instant disclosure, optionally, may contain a wax, which can be either a single type of wax or a mixture of two or more different types of waxes (hereinafter identified as, "a wax"). A wax can be added to a toner formulation or to a developer formulation, for example, to improve particular toner properties, such as, toner particle shape, charging, fusing characteristics, gloss, stripping, offset properties and the like. Alternatively, a combination of waxes can be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 wt % to about 25 wt % of the toner particles, in embodiments, from about 5 wt % to about 20 wt % of the toner particles.

Waxes that may be selected include waxes having, for example, a weight average molecular weight of from about 500 to about 20,000, in embodiments, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate, and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

c. Aggregating Factor

An aggregating factor may be an inorganic cationic coagulant, such as, for example, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium, other metal halides including monovalent and divalent halides.

The aggregating factor may be present in an emulsion in an amount of from, for example, from about 0 to about 10 wt %, or from about 0.05 to about 5 wt % based on the total solids in the toner.

The aggregating factor may also contain minor amounts of other components, for example, nitric acid.

In embodiments, a sequestering agent or chelating agent may be introduced after aggregation is complete to sequester or extract a metal complexing ion, such as, aluminum from the aggregation process. Thus, the sequestering, chelating or complexing agent used after aggregation is complete may comprise an organic complexing component, such as, ethylenediaminetetraacetic acid (EDTA), gluconal, hydroxyl-2, 2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1, 1-diphosphonic acid, aminotrimethylenephosphonic acid, diethylene triaminepentamethylene phosphonic acid, ethylenediamine tetramethylene phosphonic acid, and mixtures thereof.

d. Surface Additive

In embodiments, the toner particles can be mixed with one or more of silicon dioxide or silica ($SiO_2$), titania or titanium dioxide ($TiO_2$) and/or cerium oxide. Silica may be a first silica and a second silica. The first silica may have an average primary particle size, measured in diameter, in the range of, for example, from about 5 nm to about 50 nm, such as, from about 5 nm to about 25 nm or from about 20 nm to about 40 nm. The second silica may have an average primary particle size, measured in diameter, in the range of, for example, from about 100 nm to about 200 nm, such as, from about 100 nm to about 150 nm or from about 125 nm to about 145 nm. The second silica may have a larger average size (diameter) than the first silica. The titania may have an average primary particle size in the range of, for example, about 5 nm to about 50 nm, such as, from about 5 nm to about 20 nm or from about 10 nm to about 50 nm. The cerium oxide may have an average primary particle size in the range of, for example, about 5 nm to about 50 nm, such as, from about 5 nm to about 20 nm or from about 10 nm to about 50 nm.

Zinc stearate also may be used as an external additive. Calcium stearate and magnesium stearate may provide similar functions. Zinc stearate may have an average primary particle size in the range of, for example, from about 500 nm to about 700 nm, such as, from about 500 nm to about 600 nm or from about 550 nm to about 650 nm.

e. Carrier

Carrier particles include those that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, nickel berry carriers as disclosed in U.S. Pat. No. 3,847,604, the entire disclosure of which is hereby incorporated herein by reference, comprised of nodular carrier beads of nickel, characterized by surfaces of reoccurring recesses and protrusions thereby providing particles with a relatively large external area, those disclosed in U.S. Pat. Nos. 4,937,166 and 4,935,326, the disclosures of which are hereby incorporated herein by reference, and so on. In embodiments, the carrier particles may have an average particle size of, for example, from about 20 to about 85 μm, such as, from about 30 to about 60 μm, or from about 35 to about 50 μm.

B. Toner Particle Preparation

1. Method a. Particle Formation

The toner particles may be prepared by any method within the purview of one skilled in the art, for example, any of the emulsion/aggregation methods can be used with the polyester resin comprising a biopolyol of interest. However, any suitable method of preparing toner particles may be used, including chemical processes, such as, suspension and encapsulation processes disclosed, for example, in U.S. Pat. Nos. 5,290,654 and 5,302,486, the disclosures of each of which are hereby incorporated by reference in entirety; by conventional granulation methods, such as, jet milling; pelletizing slabs of material; other mechanical processes; any process for producing nanoparticles or microparticles; and so on, if a polyester resin comprising a biopolyol of interest is used.

In embodiments relating to an emulsification/aggregation process, a resin can be dissolved in a solvent, and can be mixed into an emulsion medium, for example water, such as, deionized water, optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer can be present in amounts of from about 0.1% to about 5%, from about 0.5% to about 3% by weight of the resin. When such salts are added to the composition as a stabilizer, in embodiments, incompatible metal salts are not present in the composition, for example, a composition can be completely or essentially free of zinc and other incompatible metal ions, for example, Ca, Fe, Ba etc., that form water-insoluble salts. The term "essentially free" refers, for example, to the incompatible metal ions as present at a level of less than about 0.01%, less than about 0.005% or less than about 0.001%, by weight of the wax and resin. The stabilizer can be added to the mixture at ambient temperature, or can be heated to the mixture temperature prior to addition.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

Following emulsification, toner compositions may be prepared by aggregating a mixture of a resin, a pigment, an optional wax and any other desired additives in an emulsion, optionally, with surfactants as described above, and then optionally coalescing the aggregate mixture. A mixture may be prepared by adding an optional wax or other materials, which may also be optionally in a dispersion, including a surfactant, to the emulsion comprising a resin-forming material and a pigments, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing can be at from about 600 to about 4,000 rpm. Homogenization may be by any suitable means, including, for example, an IKA ULTRA TURRAX T50 probe homogenizer.

b. Aggregation

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same.

The aggregating factor, as provided above, may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the glass transition temperature ($T_g$) of the resin or of a polymer.

The aggregating factor may be added to the mixture components to form a toner in an amount of, for example, from about 0.1 part per hundred (pph) to about 1 pph, in embodiments, from about 0.25 pph to about 0.75 pph, in embodiments, about 0.5 pph of the reaction mixture.

To control aggregation of the particles, the aggregating factor may be metered into the mixture over time. For example, the factor may be added incrementally into the mixture over a period of from about 5 to about 240 minutes, in embodiments, from about 30 to about 200 minutes.

Addition of the aggregating factor also may be done while the mixture is maintained under stirred conditions, in embodiments, from about 50 rpm to about 1,000 rpm, in embodiments, from about 100 rpm to about 500 rpm; and at a temperature that is below the $T_g$ of the resin or polymer, in embodiments, from about 30° C. to about 90° C., in embodiments, from about 35° C. to about 70° C. The growth and shaping of the particles following addition of the aggregation factor may be accomplished under any suitable condition(s).

The particles may be permitted to aggregate until a predetermined desired particle size is obtained. Particle size can be monitored during the growth process. For example, samples may be taken during the growth process and analyzed, for example, with a Coulter Counter, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, in embodiments, from about hour 1 to about 5 hours, while maintaining stirring, to provide the desired aggregated particles. Once the predetermined desired particle size is attained, the growth process is halted.

The characteristics of the toner particles may be determined by any suitable technique and apparatus. Volume average particle diameter and geometric standard deviation may be measured using an instrument, such as, a Beckman Coulter Multisizer 3, operated in accordance with the instructions of the manufacturer. Representative sampling may occur by taking a sample, filtering through a 25 μm membrane, diluting in an isotonic solution to obtain a concentration of about 10% and then reading the sample, for example, in a Beckman Coulter Multisizer 3.

The growth and shaping may be conducted under conditions in which aggregation occurs separate from coalescence. For separate aggregation and coalescence stages, the aggregation process may be conducted under shearing conditions at an elevated temperature, for example, of from about 40° C. to about 90° C., in embodiments, from about 45° C. to about 80° C., which may be below the $T_g$ of the resin or a polymer.

In embodiments, the aggregate particles may be of a size of less than about 3 μm, in embodiments from about 2 μm to about 3 μm, in embodiments from about 2.5 μm to about 2.9 μm.

In embodiments, after aggregation, but prior to coalescence, a resin coating may be applied to the aggregated particles to form a shell thereover. Any resin described herein or as known in the art may be used as the shell. In embodiments, a polyester amorphous resin latex as described herein may be included in the shell. In embodiments, a polyester amorphous resin latex described herein may be combined with a different resin, and then added to the particles as a resin coating to form a shell.

A shell resin may be applied to the aggregated particles by any method within the purview of those skilled in the art. In embodiments, the resins used to form the shell may be in an emulsion, optionally including any surfactant described herein. The emulsion possessing the resins may be combined with the aggregated particles so that the shell forms over the aggregated particles.

The formation of the shell over the aggregated particles may occur while heating to a temperature from about 30° C. to about 80° C., in embodiments from about 35° C. to about 70° C. The formation of the shell may take place for a period of time from about 5 minutes to about 10 hours, in embodiments from about 10 minutes to about 5 hours.

The shell may be present in an amount from about 1% by weight to about 80% by weight of the toner components, in embodiments from about 10% by weight to about 40% by weight of the toner components, in embodiments from about 20% by weight to about 35% by weight of the toner components.

c. Coalescence

Following aggregation to a desired particle size and application of any optional shell, the particles then may be coalesced to a desired final shape, such as, a circular shape, for example, to correct for irregularities in shape and size, the coalescence being achieved by, for example, heating the mixture to a temperature from about 45° C. to about 100° C., in embodiments from about 55° C. to about 99° C., which may be at or above the $T_g$ of the resins used to form the toner particles, and/or reducing the stirring, for example to from about 1000 rpm to about 100 rpm, in embodiments from about 800 rpm to about 200 rpm. Coalescence may be conducted over a period from about 0.01 to about 9 hours, in embodiments from about 0.1 to about 4 hours, see, for example, U.S. Pat. No. 7,736,831.

After aggregation and/or coalescence, the mixture may be cooled to room temperature, such as, from about 20° C. to about 25° C. The cooling may be rapid or slow, as desired. A suitable cooling method may include introducing cold water to a jacket around the reactor. After cooling, the toner particles optionally may be washed with water and then dried. Drying may be by any suitable method, including, for example, freeze-drying.

Optionally, a coalescing agent can be used. Examples of suitable coalescence agents include, but are not limited to, benzoic acid alkyl esters, ester alcohols, glycol/ether-type solvents, long chain aliphatic alcohols, aromatic alcohols, mixtures thereof and the like. Examples of benzoic acid alkyl esters include those where the alkyl group, which can be straight or branched, substituted or unsubstituted, has from about 2 to about 30 carbon atoms, such as decyl or isodecyl benzoate, nonyl or isononyl benzoate, octyl or isooctyl benzoate, 2-ethylhexyl benzoate, tridecyl or isotridecyl benzoate, 3,7-dimethyloctyl benzoate, 3,5,5-trimethylhexyl benzoate, mixtures thereof and the like. Examples of such benzoic acid alkyl esters include VELTA® 262 (isodecyl benzoate) and VELTA® 368 (2-ethylhexyl benzoate) available from Velsicol Chemical Corp. Examples of ester alcohols include hydroxyalkyl esters of alkanoic acids, where the alkyl group, which can be straight or branched, substituted or unsubstituted, and can have from about 2 to about 30 carbon atoms, such as, 2,2,4-trimethylpentane-1,3-diol monoisobutyrate. An example of an ester alcohol is TEXANOL® (2,2,4-trimethylpentane-1,3-diol monoisobutyrate) available from Eastman Chemical Co. Examples of glycol/ether-type solvents include diethylene glycol monomethylether acetate, diethylene glycol monobutylether acetate, butyl carbitol acetate (BCA) and the like. Examples of long chain aliphatic alcohols include those where the alkyl group is from about 5 to about 20 carbon atoms, such as, ethylhexanol, octanol, dodecanol and the like. Examples of aromatic alcohols include benzyl alcohol and the like.

In embodiments, the coalescence agent (or coalescing agent or coalescence aid agent) evaporates during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent can be added prior to the coalescence or fusing step in any desired or suitable amount. For example, the coalescence agent can be added in an amount of from about 0.01 to about 10% by weight, based on the solids content in the reaction medium, or from about 0.05, or from about 0.1%, to about 0.5 or to about 3.0% by weight, based on the solids content in the reaction medium. Of course, amounts outside those ranges can be used, as desired.

In embodiments, the coalescence agent can be added at any time between aggregation and coalescence, although in some embodiments it may be desirable to add the coalescence agent after aggregation is, "frozen," or completed, for example, by adjustment of pH, for example, by addition, for example, of base.

Coalescence may proceed and be accomplished over a period of from about 0.1 to about 9 hours, in embodiments, from about 0.5 to about 4 hours.

After coalescence, the mixture may be cooled to room temperature, such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze drying.

d. Shells

In embodiments, an optional shell may be applied to the formed toner particles, aggregates or coalesced particles. Any polymer, including those described above as suitable for the core, may be used for the shell. The shell polymer may be applied to the particles or aggregates by any method within the purview of those skilled in the art.

In embodiments, an amorphous polyester resin may be used to form a shell over the particles or aggregates to form toner particles or aggregates having a core-shell configuration. In some embodiments, a low molecular weight amorphous polyester resin may be used to form a shell over the particles or aggregates.

The shell polymer may be present in an amount of from about 10% to about 32% by weight of the toner particles or aggregates, in embodiments, from about 24% to about 30% by weight of the toner particles or aggregates.

Once the desired final size of the toner particles or aggregates is achieved, the pH of the mixture may be adjusted with base to a value of from about 6 to about 10, in embodiments, from about 6.2 to about 7. The adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like. In embodiments, EDTA may be added to assist adjusting the pH to the desired value.

The base may be added in amounts from about 2 to about 25% by weight of the mixture, in embodiments, from about 4 to about 10% by weight of the mixture. Following aggregation to the desired particle size, with the formation of an optional shell as described above, the particles then may be coalesced to the desired final shape, the coalescence being achieved by, for example, heating the mixture to a temperature of from about 55° C. to about 100° C., in embodiments, from about 65° C. to about 75° C., in embodiments, about 70° C., which may be below the melting point of the resin or polymer(s) to prevent plasticization. Higher or lower temperatures may be used, it being understood that the temperature is a function of the polymer(s) used for the core and/or shell.

e. Optional Additives

In embodiments, the toner particles also may contain other optional additives.

i. Charge Additives

The toner may include any known charge additives in amounts of from about 0.1 to about 10 weight %, in embodiments, of from about 0.5 to about 7 weight % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosures of each of which are hereby incorporated by reference in entirety, negative charge enhancing additives, such as, aluminum complexes, and the like.

Charge enhancing molecules can be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

Such enhancing molecules can be present in an amount of from about 0.1 to about 10% or from about 1 to about 3% by weight.

ii. Surface Modifications

Surface additives can be added to the toner compositions of the present disclosure, for example, after washing or drying. Examples of such surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosures of each of which are hereby incorporated by reference in entirety.

Surface additives may be used in an amount of from about 0.1 to about 10 wt %, or from about 0.5 to about 7 wt % of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosures of each of which hereby are incorporated by reference in entirety, also can be present. The additive can be present in an amount of from about 0.05 to about 5%, and in embodiments, of from about 0.1 to about 2% of the toner, which additives can be added during the aggregation or blended into the formed toner product.

Silica, for example, can enhance toner flow, tribo control, admix control, improved development and transfer stability and higher toner blocking temperature. Zinc, calcium or magnesium stearate also can provide developer conductivity, tribo enhancement, higher toner charge and charge stability. The external surface additives can be used with or without a coating or shell.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained catalyst, for example, $Al^{3+}$, in toner particles of the present disclosure may be from about 0.1 pph to about 1 pph, in embodiments, from about 0.25 pph to about 0.8 pph, in embodiments, about 0.5 pph. The gloss level of a toner of the instant disclosure may have a gloss, as measured by Gardner Gloss Units (ggu), of from about 20 ggu to about 100 ggu, in embodiments, from about 50 ggu to about 95 ggu, in embodiments, from about 60 ggu to about 90 ggu.

Hence, a particle can contain at the surface one or more silicas, one or more metal oxides, such as, a titanium oxide and a cerium oxide, a lubricant, such as, a zinc stearate and so on. In some embodiments, a particle surface can comprise two silicas, two metal oxides, such as, titanium oxide and cerium oxide, and a lubricant, such as, a zinc stearate. All of those surface components can comprise about 5% by weight of a toner particle weight. There can also be blended with the toner compositions, external additive particles including flow aid additives, which additives may be present on the surface of the toner particles. Examples of these additives include metal oxides like titanium oxide, tin oxide, mixtures thereof, and the like; colloidal silicas, such as AEROSIL®, metal salts and metal salts of fatty acids, including zinc stearate, aluminum oxides, cerium oxides, and mixtures thereof. Each of the external additives may be present in embodiments in amounts of from about 0.1 to about 5 wt %, or from about 0.1 to about 1 wt %, of the toner. Several of the aforementioned additives are illustrated in U.S. Pat. Nos. 3,590,000, 3,800,588, and 6,214,507, the disclosures which are incorporated herein by reference.

Toners may possess suitable charge characteristics when exposed to extreme relative humidity (RH) conditions. The low humidity zone (C zone) may be about 10° C. and 15% RH, while the high humidity zone (A zone) may be about 28° C. and 85% RH.

Toners of the instant disclosure also may possess a parent toner charge per mass ratio (Q/M) of from about −5 µC/g to about −90 µC/g, and a final toner charge after surface additive blending of from about −15 µC/g to about −80 µC/g.

Other desirable characteristics of a toner include storage stability, particle size integrity, high rate of fusing to the substrate or receiving member, sufficient release of the image from the photoreceptor, nondocument offset, use of smaller-sized particles and so on, and such characteristics can be obtained by including suitable reagents, suitable additives or both, and/or preparing the toner with particular protocols.

The dry toner particles, exclusive of external surface additives, may have the following characteristics: (1) volume average diameter (also referred to as "volume average particle diameter") of from about 2.5 to about 20 µm, in embodiments, from about 2.75 to about 10 µm, in embodiments, from about 3 to about 7.5 µm; (2) number average geometric standard deviation (GSDn) and/or volume average geometric standard deviation (GSDv) of from about 1.18 to about 1.30, in embodiments, from about 1.21 to about 1.24; and (3) circularity of from about 0.9 to about 1.0 (measured with, for example, a Sysmex FPIA 2100 analyzer), in embodiments, from about 0.95 to about 0.985, in embodiments, from about 0.96 to about 0.98.

III. Developers

A. Composition

The toner particles thus formed may be formulated into a developer composition. For example, the toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer, with the remainder of the developer composition being the carrier. However, different toner and carrier percentages may be used to achieve a developer composition with desired characteristics.

1. Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 wt % to about 70 to about 30 wt %, in embodiments, from about 40 to about 60 wt % to about 60 to about 40 wt %. The coating may have a coating weight of, for example, from about 0.1 to about 5% by weight of the carrier, in embodiments, from about 0.5 to about 2% by weight of the carrier.

In embodiments, PMMA, for example, may be copolymerized with any desired monomer, so long as the resulting copolymer retains a suitable particle size. Suitable monomers include monoalkyl or dialkyl amines, such as, a dimethylaminoethyl methacrylate, diethylaminoethyl methacrylate, diisopropylaminoethyl methacrylate or butylaminoethyl methacrylate, and the like.

Various effective suitable means can be used to apply the polymer to the surface of the carrier core, for example, cascade roll mixing, tumbling, milling, shaking, electrostatic powder cloud spraying, fluidized bed mixing, electrostatic disc processing, electrostatic curtain processing, combinations thereof and the like. The mixture of carrier core particles and polymer then may be heated to enable the polymer to melt and to fuse to the carrier core. The coated carrier particles then may be cooled and thereafter classified to a desired particle size.

The carrier particles may be prepared by mixing the carrier core with polymer in an amount from about 0.05 to about 10% by weight, in embodiments, from about 0.01 to about 3% by weight, based on the weight of the coated carrier particle, until adherence thereof to the carrier core is obtained, for example, by mechanical impaction and/or electrostatic attraction.

In embodiments, suitable carriers may include a steel core, for example, of from about 25 to about 100 µm in size, in embodiments, from about 50 to about 75 µm in size, coated with about 0.5% to about 10% by weight, in embodiments, from about 0.7% to about 5% by weight of a polymer mixture including, for example, methylacrylate and carbon black, using the process described, for example, in U.S. Pat. Nos. 5,236,629 and 5,330,874.

IV. Devices Comprising a Toner Particle

Toners and developers can be combined with a number of devices ranging from enclosures or vessels, such as, a vial, a bottle, a flexible container, such as a bag or a package, and so on, to devices that serve more than a storage function.

A. Imaging Device Components

The toner compositions and developers of interest can be incorporated into devices dedicated, for example, to delivering same for a purpose, such as, forming an image. Hence, particularized toner delivery devices are known, see, for example, U.S. Pat. No. 7,822,370, and can contain a toner preparation or developer of interest. Such devices include cartridges, tanks, reservoirs and the like, and can be replaceable, disposable or reusable. Such a device can comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

B. Toner or Developer Delivery Device

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

V. Imaging Devices

The toners or developers can be used for electrostatographic or electrophotographic processes, including those disclosed in U.S. Pat. No. 4,295,990, the disclosure of which hereby is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Imaging processes include, for example, preparing an image with an electrophotographic device including, for example, one or more of a charging component, an imaging component, a photoconductive component, a developing component, a transfer component, a fusing component and so on. The electrophotographic device may include a high speed printer, a color printer and the like.

Once the image is formed with toners/developers via a suitable image development method, such as any of the aforementioned methods, the image then may be transferred to an image receiving medium or substrate, such as, a paper and the like. In embodiments, the fusing member or component, which can be of any desired or suitable configuration, such as, a drum or roller, a belt or web, a flat surface or platen, or the like, may be used to set the toner image on the substrate. Optionally, a layer of a liquid, such as, a fuser oil can be applied to the fuser member prior to fusing.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated. As used herein, "room temperature," (RT) refers to a temperature of from about 20° C. to about 30° C.

EXAMPLES

Comparative Example 1 (Comp Ex)

A 1 liter Parr reactor equipped with a mechanical stirrer, bottom drain valve and distillation apparatus, was charged with dimethyl 2,6-naphthalenedicarboxylate (NDC, 366 g, 1500 mmoles, 0.36 eq), D-isosorbide (IS, 79 g, 542 mmoles, 0.13 eq), 1,2-propanediol (1,2-PG, 117 g, 1542 mmoles, 0.37 eq) and 0.687 g of Fascat 4100 (Brenntag Specialties) catalyst. The reactor was blanketed with nitrogen and the temperature of the reactor was slowly raised to 205° C. with stirring (once the solids melted). After about 5 hours, the reactor was opened and succinic acid (SA, 54.1 g, 458 mmoles, 0.11 eq) and Pripol 1012 (Croda) dimer diacid fatty acid (DA, 70.6 g, 125 mmoles, 0.03 eq) were added to the prepolymer mixture. At that point, approximately 70 g of methanol were distilled over. The reaction mixture was held under nitrogen at 205° C. and stirring at 230 rpm overnight. About 20.5 g of distillate were collected overnight.

In the second step, low vacuum was applied for 90 minutes. The vacuum was switched to a higher vacuum (<0.1 Torr). During that time, a low molecular weight polymer was formed with minimal distillate collected. High vacuum was applied for about 6 hours. Once the softening point reached 116° C., the temperature was lowered to 170° C. and 12.1 g of citric acid (CA) were added to the reactor. The polymer was reacted with citric acid for 6 hours under a blanket of nitrogen before discharging onto a polytetrafluoroethylene (Teflon) pan.

The final softening point of the resin was 114.3° C. with an acid value of 18.1 mg KOH/g.

Example 1 (Ex 1)

A 1 liter Parr reactor equipped with a mechanical stirrer, bottom drain valve and distillation apparatus was charged with dimethyl 2,6-naphthalenedicarboxylate (NDC, 366 g, 1500 mmoles, 0.36 eq), D-isosorbide (IS, 79 g, 542 mmoles, 0.13 eq), D-mannitol (53.1 g, 292 mmoles, 0.07 eq), 1,2-propanediol (1,2-PG, 95 g, 1250 mmoles, 0.30 eq) and 0.722 g of Fascat 4100 catalyst. The reactor was blanketed with nitrogen and the temperature of the reactor was slowly raised to 200° C. with stirring (once the solids melted). After about 6.5 hours, the reactor was opened and succinic acid (SA, 54.1 g, 458 mmoles, 0.11 eq) and Pripol 1012 dimer diacid (DA, 70.6 g, 125 mmoles, 0.03 eq) were added to the prepolymer mixture. At that point, approximately 46.5 g of methanol were distilled over. The reaction mixture was held under nitrogen at 200° C. and stirring at 230 rpm overnight. About 37.2 g of distillate were collected overnight.

In the second step, low vacuum was applied for 60 minutes. The vacuum was switched to a higher vacuum (<0.1 Torr). During that time, a low molecular weight polymer was formed with minimal distillate collected. High vacuum was applied for about 12 hours. Once the softening point reached 123° C., the temperature was lowered to 165° C. and 12.0 g of citric acid (CA) were added to the reactor. The polymer was reacted with citric acid for 2 hours under low vacuum before discharging onto a polytetrafluoroethylene (Teflon) pan.

The final softening point of the resin was 125.2° C. with an acid value of 14.2 mg KOH/g.

Example 2 (Ex 2)

A 1 liter Parr reactor equipped with a mechanical stirrer, bottom drain valve and distillation apparatus was charged with dimethyl 2,6-naphthalenedicarboxylate (NDC, 366 g, 1500 mmoles, 0.36 eq), D-isosorbide (IS, 79 g, 542 mmoles, 0.13 eq), myo-inositol (52.5 g, 292 mmoles, 0.07 eq), 1,2-propanediol (1,2-PG, 95 g, 1250 mmoles, 0.30 eq) and 0.722 g of Fascat 4100 catalyst. The reactor was blanketed with nitrogen and the temperature of the reactor was slowly raised to 200° C. with stirring (once the solids melted). After about 7 hours, the reactor was opened and succinic acid (SA, 54.1 g, 458 mmoles, 0.11 eq) and Pripol 1012 dimer diacid (DA, 70.6 g, 125 mmoles, 0.03 eq) were added to the prepolymer mixture. At that point, approximately 49.0 g of methanol were distilled over. The reaction mixture was held under nitrogen at 200° C. and stirring at 230 rpm overnight. About 25.9 g of distillate were collected overnight.

In the second step, low vacuum was applied for 150 minutes. The vacuum was switched to a higher vacuum (<0.1 Torr). During that time, a low molecular weight polymer was formed with minimal distillate collected. High vacuum was applied for about 10 hours. Once the softening point reached 113° C., the temperature was lowered to 170° C. and 11.96 g of citric acid (CA) were added to the reactor. The polymer was reacted with citric acid for 3 hours under low vacuum before discharging onto a polytetrafluoroethylene (Teflon) pan.

The final softening point of the resin was 119.4° C. The acid value is estimated to be around 14-15 mg KOH/g.

Example 3 (Ex 3)

A 1 liter Parr reactor equipped with a mechanical stirrer, bottom drain valve and distillation apparatus was charged with dimethyl 2,6-naphthalenedicarboxylate (NDC, 366 g, 1500 mmoles, 0.36 eq), D-isosorbide (IS, 79 g, 542 mmoles, 0.13 eq), D-mannitol (106 g, 583 mmoles, 0.14 eq), 1,2-propanediol (1,2-PG, 31.7 g, 417 mmoles, 0.10 eq) and 0.722 g of Fascat 4100 catalyst. The reactor was blanketed with nitrogen and the temperature of the reactor was slowly raised to 200° C. with stirring (once the solids melted). Next day, the reactor was opened and succinic acid (SA, 54.1 g, 458 mmoles, 0.11 eq) and Pripol 1012 dimer diacid (DA, 70.6 g, 125 mmoles, 0.03 eq) were added to the prepolymer mixture. At that point, approximately 58.2 g of methanol were distilled over. The reaction mixture was held under nitrogen at 200° C. and stirring at 230 rpm overnight. About 15.51 g of distillate were collected overnight.

In the second step, low vacuum was applied for 40 minutes. The vacuum was switched to a higher vacuum (<0.1 Torr). During that time, a low molecular weight polymer was formed with minimal distillate collected. High vacuum was applied for about 6 hours. At this point, the softening point of the polymer reached 136.1° C. and was visually cross linked (gelatinous and thick at 200° C.). Thus, CA was not needed. The temperature was increased to 220° C. to aid discharge onto a polytetrafluoroethylene (Teflon) pan.

The final softening point of the resin was 136.1° C. with an acid value of 20.3 mg KOH/g.

Example 4

The four resins were analysed. The content of biologically based or originated reagent in each of the four resins described above was 54.8 wt %.

The composition of the four resins, in part, is summarized in Table 1 below. The four resins have equivalent amounts of the naphthalene dicarboxylate (NDC), dimer acid (DA), succinic acid (SA) and isosorbide (IS). The control resin, that of Comparative Example 1 (Comp Ex), contained 0.37 mole/eq of 1,2-PG, 1,2-propanediol. The experimental resins contained reduced and graded amounts of 1,2-PG, being replaced with a biopolyol, mannitol in Examples 1 (Ex 1) and 3 (Ex 3), and inositol in Example 2 (Ex 2).

Table 2 below summarizes data relating to some of the properties of the four resins. The resins had comparable carbon:oxygen (C/O) ratios, onset glass transition temperatures ($T_g$), softening temperatures ($T_s$) and acid values (AV).

The GPC data indicate mannitol and inositol can be used as a polyol in a resin-forming reaction to provide a polymer that has the properties suitable for use in producing imaging components. The linear mannitol, under the conditions used, produced robust polymerization in a dose responsive manner.

Figure 2:
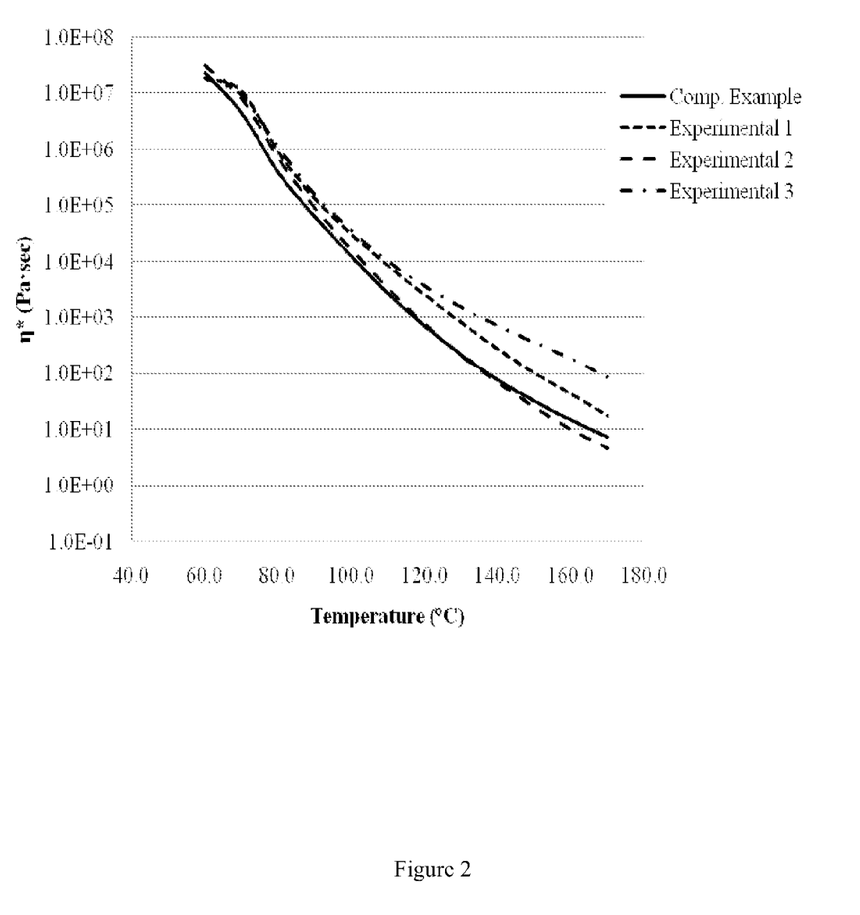
FIG. 2 is a graph depicting rheologic properties of the produced resins.

FIG. 2 depicts viscosity data of the four resins. The viscosity of the resins was compared over a temperature sweep of 60° C. to 170° C. In concert with the GPC data, the size of the polymer impacted viscosity. The resins of interest had a viscosity comparable to that of the control resin that did not contain a biopolyol (Comparative Example 1, Comp Ex). The level of viscosity can be controlled by varying the biopolyol and the amount of biopolyol used in the polymerization reaction.

Table 3 below summarizes properties of the three experimental resins of interest (Ex 1-3), a comparative resin not containing a biopolyol (Comp Ex) and three commercially available resins used in making toner, one high molecular weight resin (High MW), a low molecular weight resin (Low MW) and a biopolymer, Bio-Rez, available from Advanced Imaging Resources.

The resins all are generally comparable as to glass transition temperature and softening temperature. The viscosity and solubility generally are controllable by selecting a biopolyol and the amount of biopolyol used.

Hence, the biopolyols of interest can be used to make resins with properties suitable for making toner.

TABLE 1

Resin Composition

| Resin | Monomers (mole/eq) | | | | | |
|---|---|---|---|---|---|---|
|  | NDC | DA | SA | IS | 1,2-PG | Biopolyol |
| Comp Ex | 0.36 | 0.03 | 0.11 | 0.13 | 0.37 | — |
| Ex 1 | 0.36 | 0.03 | 0.11 | 0.13 | 0.30 | 0.07 |
| Ex 2 | 0.36 | 0.03 | 0.11 | 0.13 | 0.30 | 0.07 |
| Ex 3 | 0.36 | 0.03 | 0.11 | 0.13 | 0.10 | 0.14 |

TABLE 2

Resin Properties

| Resin | C/O | $T_g$ ° C. | $T_s$ ° C. | AV mg KOH/g | $M_w$ | $M_n$ |
|---|---|---|---|---|---|---|
| Comp Ex | 3.67 | 46.0 | 114.3 | 18.1 | 5424 | 2726 |
| Ex 1 | 3.64 | 48.1 | 125.2 | 14.2 | 22574 | 2566 |
| Ex 2 | 3.64 | 47.4 | 119.4 | 14-15 | 4482 | 1357 |
| Ex 3 | 3.91 | 42.8 | 136.1 | 20.3 | 113590 | 1137 |

TABLE 3

Comparative Resin Properties

| Resin | Tg ° C. | Ts ° C. | AV mg KOH/mg | $M_w$ | $M_n$ |
|---|---|---|---|---|---|
| Comp Ex | 46.0 | 114.3 | 18.1 | 5424 | 2726 |
| Ex 1 | 48.1 | 125.2 | 14.2 | 22574 | 2566 |
| Ex 2 | 47.4 | 119.4 | 14-15 | 4482 | 1357 |
| Ex 3 | 42.8 | 136.1 | 20.3 | 113590 | 1137 |
| Bio-Rez 64-113 | 53.0 | 111.7 | 10.7 | 6184 | 2984 |
| High MW Resin | 56.8 | 128.6 | 13.5 | 140400 | 5500 |
| Low MW Resin | 60.4 | 118.0 | 11.7 | 18866 | 4441 |

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A toner composition, comprising:
at least one toner polyester resin comprising (a) a polyacid or polyester, (b) an organic polyol, wherein said organic polyol is in an amount from about 40 to about 60 mole %, and (c) a biodegradable polyol, wherein said biodegradable polyol is in an amount from about 0.1 to about 10 mole %, and optionally
one or more of a colorant, a wax, an amorphous polyester resin, a crystalline polyester resin a surfactant, an initiator, a catalyst or a coagulant.

2. The toner composition of claim 1, further comprising a shell.

3. The toner composition of claim 1, wherein said biodegradable polyol comprises a sugar or a sugar alcohol.

4. The toner composition of claim 1, wherein said biodegradable polyol comprises an adonitol, an arabitol, a sorbitol, a mannitol, a galactitol, an isomalt, an inositol, a lactitol, a xylitol, a maltitol, a 1-methyl-glucopyranoside, an erythritol, a diglycerol, a 1-methylgalactopyranoside, a 1-methyl-mannopyranoside, a polyglycerol, a sucrose, a glucose, an amylase, a nystose, a kestose, a trehalose, a raffinose, a gentianose or combinations thereof.

5. An imaging component comprising the toner composition of claim 1.

6. The toner composition of claim 1, wherein said polyacid comprises three or more carboxylic acid groups, or said polyester comprises three or more ester groups.

7. The toner composition of claim 1, wherein said polyacid comprises an azelaic acid, a succinic acid, a cyclohexanedioic acid, a naphthalene dicarboxylic acid, a dimer diacid, a terephthalic acid, a glutamic acid or combinations thereof.

8. The toner composition of claim 1, wherein said biodegradable polyol comprises three or more hydroxyl groups.

9. The toner composition of claim 1, wherein the at least one polyester resin comprises one or more of the following properties; a $T_g$(onset) of at least about 40° C., a $T_s$ of at least about 110° C., an acid value of at least about 10 or an $M_W$ of at least about 5000.

10. The toner composition of claim 9, wherein said molecular weight is at least about 15,000.

11. The toner composition of claim 9, wherein said molecular weight is at least about 150,000.

12. A developer comprising the imaging component of claim 5.

13. The toner composition of claim 1, comprising an emulsion aggregation toner particle.

14. A developer comprising the toner composition of claim 1.

15. The developer of claim 14, comprising an emulsion aggregation toner particle.

16. A method for making a toner particle comprising;
a) forming an emulsion of at least one polyester resin comprising (a) a polyacid or polyester, (b) an organic polyol, wherein said organic polyol is in an amount from about 40 to about 60 mole %, and (c) a biodegradable polyol, wherein said biodegradable polyol is in an amount from about 0.1 to about 10 mole %;
b) aggregating said emulsion to form a particle; and
c) coalescing said particle to form a toner particle.

17. The method of claim 16, wherein one or more of a colorant, a wax, a surfactant, an initiator, a catalyst, an amorphous resin or a crystalline polyester resin are added to said emulsion.

18. The method for making a toner particle of claim 16, further comprising crosslinking said at least one polyester resin to form a crosslinked polyester resin.

19. The method of claim 16, further comprising exposing said toner particle to a resin to form a shell.

* * * * *